United States Patent
Drebin et al.

(10) Patent No.: US 9,727,385 B2
(45) Date of Patent: Aug. 8, 2017

(54) GRAPHICAL PROCESSING UNIT (GPU) IMPLEMENTING A PLURALITY OF VIRTUAL GPUS

(75) Inventors: Robert A. Drebin, Palo Alto, CA (US); James Wang, Vista, CA (US)

(73) Assignee: Apple Inc., Cupertino, CA (US)

( * ) Notice: Subject to any disclaimer, the term of this patent is extended or adjusted under 35 U.S.C. 154(b) by 755 days.

(21) Appl. No.: 13/495,597

(22) Filed: Jun. 13, 2012

(65) Prior Publication Data

US 2013/0021353 A1    Jan. 24, 2013

Related U.S. Application Data

(60) Provisional application No. 61/509,089, filed on Jul. 18, 2011.

(51) Int. Cl.
G06F 15/16 (2006.01)
G06F 9/50 (2006.01)
G06T 1/60 (2006.01)
G06T 1/20 (2006.01)

(52) U.S. Cl.
CPC .............. *G06F 9/5077* (2013.01); *G06T 1/20* (2013.01); *G06T 1/60* (2013.01)

(58) Field of Classification Search
CPC ........... G06T 1/20; G06T 15/005; G06T 1/60
USPC .................. 345/502; 718/104; 711/170–173
See application file for complete search history.

(56) References Cited

U.S. PATENT DOCUMENTS 6,483,505 B1    11/2002  Morein et al.
6,897,871 B1    5/2005   Morein et al.
6,952,214 B2    10/2005  Naegle et al.
7,072,052 B1 *  7/2006   Tanahashi et al. ............ 358/1.1
7,327,369 B2    2/2008   Morein et al.
(Continued)

FOREIGN PATENT DOCUMENTS

CN    1912926       2/2007
JP    2006-318404   11/2006
(Continued)

OTHER PUBLICATIONS

Styblinski and Opalski, Algorithms and Software Tools for IC Yield Optimizaation Based on Fundamental Fabrication Parameters, Jan. 1986, IEEE Transactions on Computer-Aided Design, vol. CAD-5, No. 1, pp. 79-89.*

(Continued)

*Primary Examiner* — Charles Tseng
(74) *Attorney, Agent, or Firm* — Meyertons, Hood, Kivlin, Kowert & Goetzel, P.C.

(57) ABSTRACT

Techniques and structures relating to virtual graphics processing units (VGPUs) are disclosed. A VGPU may appear to software as an independent hardware GPU. However, two or more VGPUs can be implemented on the same GPU through the use of control structures and by duplicating some (but not all) hardware elements of the GPU. For example, additional registers and storage space may be added in a GPU supporting multiple VGPUs. Different execution priorities may be set for tasks and threads that correspond to the different supported VGPUs. Memory address space for the VGPUs may also be managed, including use of virtual address space for different VGPUs. Halting and resuming execution of different VGPUs allows for fine-grained execution control in various embodiments.

25 Claims, 5 Drawing Sheets

(56) References Cited

U.S. PATENT DOCUMENTS

| | | | |
|---|---|---|---|
| 7,644,407 | B2 | 1/2010 | Cowperthwaite et al. |
| 7,796,129 | B2 | 9/2010 | Bakalash et al. |
| 7,928,990 | B2 | 4/2011 | Jiao et al. |
| 8,072,461 | B2 | 12/2011 | Lefebvre et al. |
| 2005/0041024 | A1* | 2/2005 | Green et al. ............... 345/426 |
| 2005/0262505 | A1* | 11/2005 | Esfahany et al. ............. 718/1 |
| 2006/0184762 | A1* | 8/2006 | Cobley ..................... 711/170 |
| 2007/0103475 | A1 | 5/2007 | Huang et al. |
| 2008/0074430 | A1 | 3/2008 | Jiao et al. |
| 2010/0013839 | A1 | 1/2010 | Rawson |
| 2011/0067038 | A1* | 3/2011 | Troccoli et al. ............ 719/327 |
| 2011/0084972 | A1 | 4/2011 | Duluk, Jr. et al. |
| 2011/0102443 | A1 | 5/2011 | Dror et al. |
| 2011/0115802 | A1 | 5/2011 | Mantor et al. |
| 2011/0145505 | A1* | 6/2011 | Anand et al. ............... 711/130 |
| 2011/0271276 | A1* | 11/2011 | Ashok et al. ................. 718/1 |
| 2012/0069032 | A1* | 3/2012 | Hansson et al. ............ 345/522 |

FOREIGN PATENT DOCUMENTS

| | | |
|---|---|---|
| JP | 2008-305408 | 12/2008 |
| JP | 2010-515122 | 5/2010 |
| WO | 2011/028981 | 3/2011 |
| WO | 2011/028986 | 3/2011 |

OTHER PUBLICATIONS

Nandgaonkar, A Family of Simulation Programs for IC Fabrication Processes (Their Structure, Design, and Implementation), Oct. 22, 1984, Electronics Research Laboratory, College of Engineering, University of California, Berkeley, pp. 1-78.*

Office Action in Japanese Application No. 2012-173370 dated Oct. 28, 2013, 4 pages.

Suresh Venkatasubramanian, "Understanding the graphics pipeline—Lecture 2," http://www.cis.upenn.edu/~suvenkat/700/, (date unconfirmed but listed as Jan. 13, 2005), 36 pages.

Extended European Search Report in Application No. 12176852.7 dated Nov. 5, 2012, 8 pages.

Micah Dowty, et al., "GPU Virtualization on VMware's Hosted I/O Architecture," ACM Operating Systems Review, vol. 43, No. 3, Jul. 31, 2009, XP-002611884, pp. 73-82.

International Search Report and Written Opinion in Application No. PCT/US2012/046414 dated Sep. 28, 2012, 15 pages.

International Preliminary Report on Patentability in Application No. PCT/US2012/046414 mailed Jan. 30, 2014, 8 pages.

Office Action in Chinese Application No. 201210249299.5 dated Sep. 26, 2014, 12 pages.

Office Action in Taiwanese Application No. 101125927 dated Feb. 12, 2015, 8 pages.

Office Action in Korean Application No. 10-2012-78202 dated Apr. 28, 2015, 3 pages.

Office Action in Chinese Application No. 201210249299.5 dated May 20, 2015, 18 pages.

Office Action in Taiwanese Application No. 101125927 dated Aug. 10, 2015, 3 pages.

Office Action in Korean Application No. 10-2012-78202 dated Aug. 19, 2015, 2 pages.

Office Action in Chinese Application No. 201210249299.5 dated Jan. 25, 2016, 5 pages.

Office Action in European Application No. 12176852.7 dated Apr. 25, 2016, 4 pages.

Dowty, et al., "GPU Virtualization on VMware's Hosted I/O Architechture," Operating Systems Review, ACM, vol. 43, No. 3 Jul. 31, 2009, pp. 73-82. [X3002611884].

* cited by examiner

GRAPHICAL PROCESSING UNIT (GPU) IMPLEMENTING A PLURALITY OF VIRTUAL GPUS

RELATED APPLICATIONS

This application claims the benefit of U.S. Provisional Application 61/509,089, filed Jul. 18, 2011, titled "Virtual GPU," which is herein incorporated by reference in its entirety.

BACKGROUND

Technical Field

This disclosure relates to graphical processing units (GPUs), and more particularly, relates to structures and techniques allowing for efficient execution of multiple GPU commands.

Description of the Related Art

GPUs can be used to execute a variety of computing tasks. A GPU can calculate pixels to be displayed on a screen, for example, and may also perform other intensive operations such as animation rendering and general vector math.

A GPU may sometimes experience "down time" (stall periods) in which one or more execution units do not perform any calculations. Down time can occur when accessing memory, for example, because an execution unit is waiting for new data to arrive. Thus, at times, one or more GPU execution units may be idle.

Further, when a first program is being executed by a GPU, a second program may have to wait. The second program may have to wait even while the first program is stalled (such as during a memory access). Although it would be advantageous for the second program to use idle GPU execution units while the first program is stalled, the overhead cost of switching to the second program may be prohibitively expensive. That is, setting up the GPU to execute the second program while the first program is stalled may take so much time and effort (i.e., power consumption) that it is not worth the trouble. While the first program stalls, GPU execution units may thus remain idle.

Accordingly, GPU execution may be inefficient, especially in environments where multiple computing tasks are being performed.

SUMMARY

This specification describes structures and techniques that allow a GPU to execute instructions more efficiently and with less down time, especially when handling multiple computing tasks (or commands). These advantages are provided in one embodiment by implementing multiple virtual GPUs in a single GPU structure. Virtual GPUs may share the same GPU hardware (e.g., execution units) while the results of computation are stored separately for each virtual GPU.

Virtual GPUs may provide an advantage over context switching, which may have high costs. Context switching from a first program to a second program, for example, may involve clearing all results and all state information from the GPU before the second program executes. Context switching may therefore include copying all register values, program counters, and other values (such as working data from memory) to external storage. These copying operations take time and consume power (which may cause a particularly negative impact on battery powered mobile devices).

The cost of GPU context switching can vary depending on when a context switch is performed. For example, context switching between frame boundaries or polygon boundaries may be less costly. This is because less intermediate state information may need to be transferred to external storage. But while context switching only on frame or polygon boundaries can be less costly, this may result in poor granularity control. For example, if frames are being drawn at 20 frames per second, it may take up to 50 milliseconds (or even longer) for the GPU to reach a frame boundary and perform a context switch to another task.

Virtual GPUs may allow instructions for different programs to be executed without the cost of performing a full context switch. In one embodiment, this is accomplished by duplicating some portions of GPU hardware and adding additional control structures to handle those duplicated portions. Virtual GPUs may also provide finer granularity control for execution, and make more efficient use of GPU hardware by allowing GPU instructions for different programs to be executed within smaller "windows" of time. For example, a GPU execution unit being used by a first program may have to stall while data is retrieved from memory. During this stall period, the execution unit is idle. The stall period may be short enough that a full context switch would be cost prohibitive. However, the lower cost of switching between virtual GPUs may allow different instructions (for a different virtual GPU) to be executed instead of having the execution unit sit idle. Accordingly, there may be less down time for GPU execution units when virtual GPUs are implemented.

The teachings of this disclosure and the appended claims, however, are expressly not limited by the features, embodiments, and/or benefits discussed in the summary above.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

The following paragraphs provide definitions and/or context for terms found in this disclosure (including the appended claims):

"Comprising." This term is open-ended. As used herein, this term does not foreclose additional structure or steps. Consider a claim that recites: "An apparatus comprising a graphics processing unit (GPU) . . . ." Such a claim does not preclude the apparatus from including additional components (e.g., a central processing unit, a memory controller, interface circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., at a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (such as spatial, temporal, logical, etc.) unless otherwise expressly noted. For example, a "first" thread and a "second" thread can be used to refer to any two threads, and does not imply that one thread was generated before or after the other thread (for example). In other words, "first" and "second" are descriptors.

Figure 1:
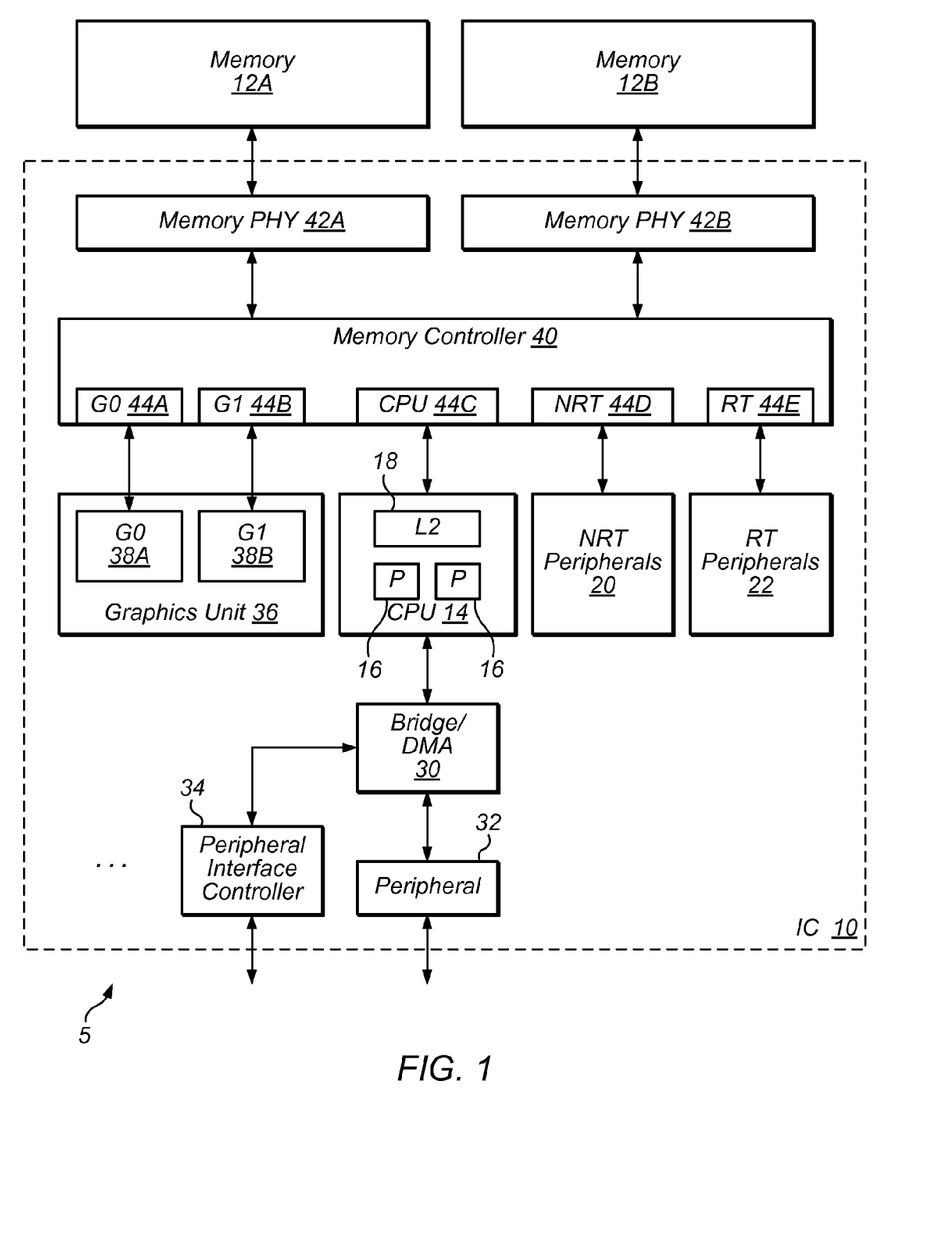
FIG. 1 is a block diagram of an embodiment of an integrated circuit.

"Based On." As used herein, this term is used to describe one or more factors that affect a determination. This term does not preclude additional factors from affecting a determination. That is, a determination may be based solely on those factors or based, at least in part, on those factors. Consider the phrase "determine A based on B." While B may be a factor that affects the determination of A, such a phrase does not foreclose the determination of A from also being based on C. In other instances, however, A may be determined based solely on B Integrated Circuit Turning now to FIG. 1, a block diagram of one embodiment of a system 5 is shown. In the embodiment of FIG. 1, the system 5 includes an integrated circuit (IC) 10 coupled to external memories 12A-12B. In the illustrated embodiment, the integrated circuit 10 includes a central processor unit (CPU) block 14 which includes one or more processors 16 and a level 2 (L2) cache 18. Other embodiments may not include L2 cache 18 and/or may include additional levels of cache. Additionally, embodiments that include more than two processors 16 and that include only one processor 16 are contemplated. The integrated circuit 10 further includes a set of one or more non-real time (NRT) peripherals 20 and a set of one or more real time (RT) peripherals 22. In the illustrated embodiment, the CPU block 14 is coupled to a bridge/direct memory access (DMA) controller 30, which may be coupled to one or more peripheral devices 32 and/or one or more peripheral interface controllers 34. The number of peripheral devices 32 and peripheral interface controllers 34 may vary from zero to any desired number in various embodiments. The system 5 illustrated in FIG. 1 further includes a graphics unit 36 comprising one or more graphics controllers such as G0 38A and G1 38B. The number of graphics controllers per graphics unit and the number of graphics units may vary in other embodiments. As illustrated in FIG. 1, the system 5 includes a memory controller 40 coupled to one or more memory physical interface circuits (PHYs) 42A-42B. The memory PHYs 42A-42B are configured to communicate on pins of the integrated circuit 10 to the memories 12A-12B. The memory controller 40 also includes a set of ports 44A-44E. The ports 44A-44B are coupled to the graphics controllers 38A-38B, respectively. The CPU block 14 is coupled to the port 44C. The NRT peripherals 20 and the RT peripherals 22 are coupled to the ports 44D-44E, respectively. The number of ports included in a memory controller 40 may be varied in other embodiments, as may the number of memory controllers. That is, there may be more or fewer ports than those shown in FIG. 1. The number of memory PHYs 42A-42B and corresponding memories 12A-12B may be one or more than two in other embodiments.

Generally, a port may be a communication point on the memory controller 40 to communicate with one or more sources. In some cases, the port may be dedicated to a source (e.g. the ports 44A-44B may be dedicated to the graphics controllers 38A-38B, respectively). In other cases, the port may be shared among multiple sources (e.g. the processors 16 may share the CPU port 44C, the NRT peripherals 20 may share the NRT port 44D, and the RT peripherals 22 may share the RT port 44E. Each port 44A-44E is coupled to an interface to communicate with its respective agent. The interface may be any type of communication medium (e.g. a bus, a point-to-point interconnect, etc.) and may implement any protocol. The interconnect between the memory controller and sources may also include any other desired interconnect such as meshes, network on a chip fabrics, shared buses, point-to-point interconnects, etc.

The processors 16 may implement any instruction set architecture, and may be configured to execute instructions defined in that instruction set architecture. The processors 16 may employ any microarchitecture, including scalar, superscalar, pipelined, superpipelined, out of order, in order, speculative, non-speculative, etc., or combinations thereof. The processors 16 may include circuitry, and optionally may implement microcoding techniques. The processors 16 may include one or more level 1 caches, and thus the cache 18 is an L2 cache. Other embodiments may include multiple levels of caches in the processors 16, and the cache 18 may be the next level down in the hierarchy. The cache 18 may employ any size and any configuration (set associative, direct mapped, etc.).

The graphics controllers 38A-38B may be any graphics processing circuitry. Generally, the graphics controllers 38A-38B may be configured to render objects to be displayed into a frame buffer. The graphics controllers 38A-38B may include graphics processors that may execute graphics software to perform a part or all of the graphics operation, and/or hardware acceleration of certain graphics operations. The amount of hardware acceleration and software implementation may vary from embodiment to embodiment. In some embodiments, graphics unit 36 and/or graphics controllers 38A-38B may include any or all of the features of graphics processing unit 50, as described below.

The NRT peripherals 20 may include any non-real time peripherals that, for performance and/or bandwidth reasons, are provided independent access to the memory 12A-12B. That is, access by the NRT peripherals 20 is independent of the CPU block 14, and may proceed in parallel with CPU block memory operations. Other peripherals such as the peripheral 32 and/or peripherals coupled to a peripheral interface controlled by the peripheral interface controller 34 may also be non-real time peripherals, but may not require independent access to memory. Various embodiments of the NRT peripherals 20 may include video encoders and decoders, scaler circuitry and image compression and/or decompression circuitry, etc.

The RT peripherals 22 may include any peripherals that have real time requirements for memory latency. For example, the RT peripherals may include an image processor and one or more display pipes. The display pipes may include circuitry to fetch one or more frames and to blend the frames to create a display image. The display pipes may further include one or more video pipelines. The result of the display pipes may be a stream of pixels to be displayed on the display screen. The pixel values may be transmitted to a display controller for display on the display screen. The image processor may receive camera data and process the data to an image to be stored in memory.

The bridge/DMA controller 30 may comprise circuitry to bridge the peripheral(s) 32 and the peripheral interface controller(s) 34 to the memory space. In the illustrated embodiment, the bridge/DMA controller 30 may bridge the memory operations from the peripherals/peripheral interface controllers through the CPU block 14 to the memory controller 40. The CPU block 14 may also maintain coherence between the bridged memory operations and memory operations from the processors 16/L2 Cache 18. The L2 cache 18 may also arbitrate the bridged memory operations with memory operations from the processors 16 to be transmitted on the CPU interface to the CPU port 44C. The bridge/DMA controller 30 may also provide DMA operation on behalf of the peripherals 32 and the peripheral interface controllers 34 to transfer blocks of data to and from memory. More particularly, the DMA controller may be configured to perform transfers to and from the memory 12A-12B through the memory controller 40 on behalf of the peripherals 32 and the peripheral interface controllers 34. The DMA controller may be programmable by the processors 16 to perform the DMA operations. For example, the DMA controller may be programmable via descriptors. The descriptors may be data structures stored in the memory 12A-12B that describe DMA transfers (e.g. source and destination addresses, size, etc.). Alternatively, the DMA controller may be programmable via registers in the DMA controller (not shown).

The peripherals 32 may include any desired input/output devices or other hardware devices that are included on the integrated circuit 10. For example, the peripherals 32 may include networking peripherals such as one or more networking media access controllers (MAC) such as an Ethernet MAC or a wireless fidelity (WIFI) controller. An audio unit including various audio processing devices may be included in the peripherals 32. One or more digital signal processors may be included in the peripherals 32. The peripherals 32 may include any other desired functional such as timers, an on-chip secrets memory, an encryption engine, etc., or any combination thereof.

The peripheral interface controllers 34 may include any controllers for any type of peripheral interface. For example, the peripheral interface controllers may include various interface controllers such as a universal serial bus (USB) controller, a peripheral component interconnect express (PCIe) controller, a flash memory interface, general purpose input/output (I/O) pins, etc.

The memories 12A-12B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the integrated circuit 10 in a chip-on-chip configuration, a package-on-package configuration, or a multi-chip module configuration.

The memory PHYs 42A-42B may handle the low-level physical interface to the memory 12A-12B. For example, the memory PHYs 42A-42B may be responsible for the timing of the signals, for proper clocking to synchronous DRAM memory, etc. In one embodiment, the memory PHYs 42A-42B may be configured to lock to a clock supplied within the integrated circuit 10 and may be configured to generate a clock used by the memory 12.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

Graphics Processing Unit Implementing Virtual GPUs

Figure 2:
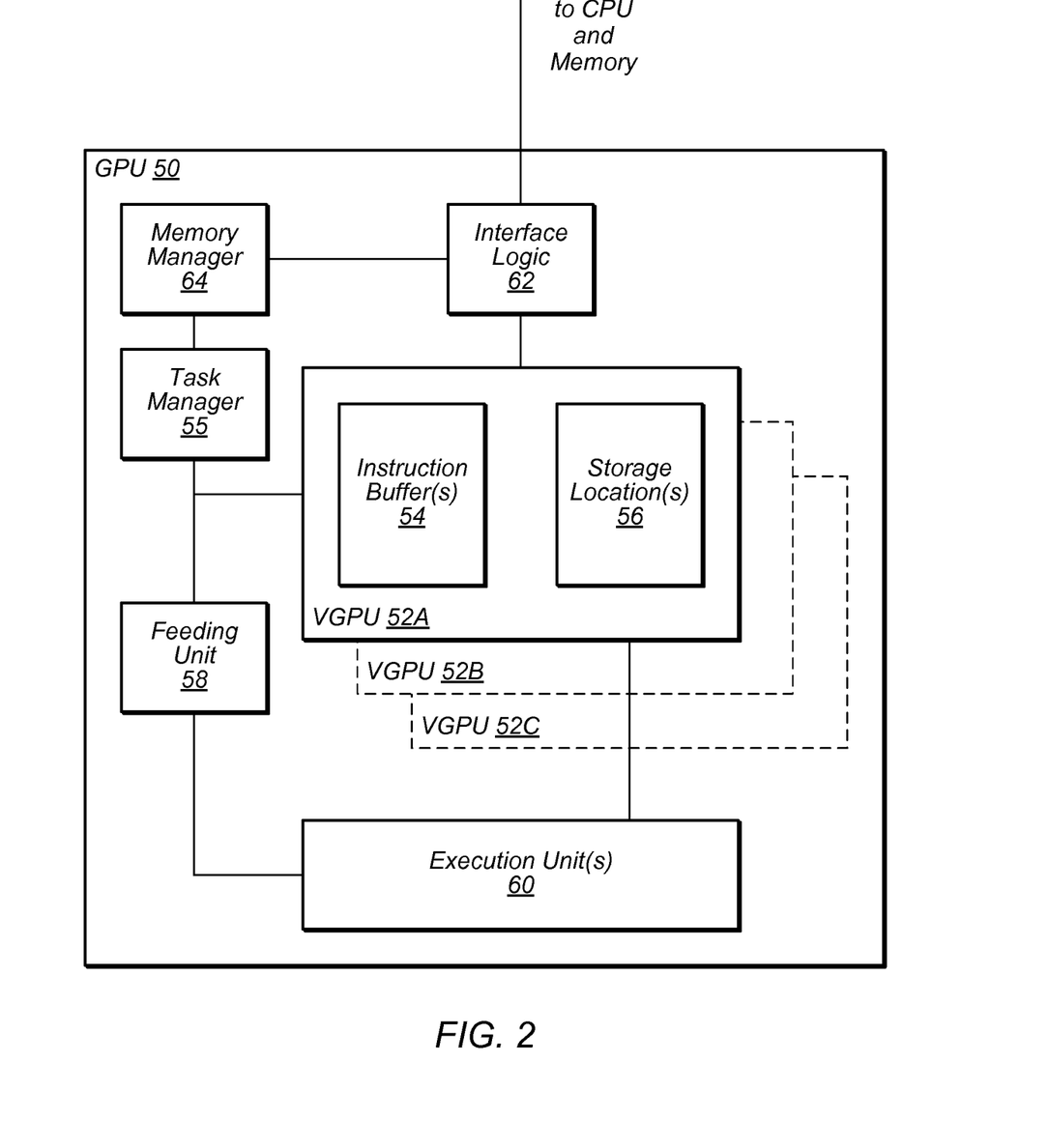
FIG. 2 is a block diagram of an embodiment of a GPU in which multiple virtual GPUs are implemented.

Turning now to FIG. 2, a block diagram shows one embodiment of a graphics processing unit (GPU) 50 that implements multiple virtual GPUs. In the embodiment of FIG. 2, GPU 50 includes an interface logic unit 62, a feeding unit 58, a task manager 55, a memory manager 64, and one or more execution units 60. GPU 50 also includes a plurality of virtual GPUs 52 (VGPUs) in this embodiment. As shown, each virtual GPU 52 includes one or more instruction buffers 54 and one or more storage locations 56.

Various structures are shown in FIG. 2 as being connected to one another. These connections may be a bus, point-to-point transmission line, or any other suitable connection as would be known to a person of skill in the art. Not all connections or interfaces between structures in GPU 50 are necessarily depicted. Thus, in various embodiments, any or all of the structures depicted in FIG. 2 may be connected as needed to any or all of the other structures in FIG. 2 by one or more suitable connections.

Any number of virtual GPUs 52 may be present in various embodiments of GPU 50. In the embodiment of FIG. 2, GPU 50 is shown with three virtual GPUs 52A-52C. In this embodiment, a respective set of one or more instruction buffers 54 and storage locations 56 corresponds to each virtual GPUs. In other embodiments, a greater or lesser number of VGPUs may be present.

Accordingly, the layout of circuitry and structures that are used to implement VGPUs may vary in different embodiments (or even within the same embodiment). For example, instruction buffer(s) 54 may be located in different areas of the GPU 50, and may include different sub-structures. In one embodiment, one of instruction buffers 54 is configured to store commands, while another one of instruction buffers 54 is configured to store tasks, while yet another one of instruction buffers 54 is configured to store threads). Instruction buffer configuration and/or allocation may vary between virtual GPUs as well. Thus, in one embodiment, a first virtual GPU may have three respective instruction buffers for commands, tasks, and threads, while another virtual GPU may use a different configuration. (Note that in general, the term "virtual GPU" may refer to one or more structures, e.g., within a GPU, that are configured to implement all or a portion of the functionality of virtual GPUs as described herein. In some embodiments though, a virtual GPU may be said to be implemented by one or more particular structures, e.g. "a first circuit, or a GPU, configured to implement a plurality of virtual GPUs . . . ")

The term "command" (or "GPU command"), as used herein, refers to a higher level command for execution by a GPU. (I.e., the term "command" does not refer to a single 32-bit or 64-bit computer instruction, for example, though a command may have one or more corresponding instructions). A GPU command may be issued to the GPU, in some embodiments, by software running on one or more threads of a CPU. In one embodiment, such a command is an OPENCL statement that may include one or more pointers to memory. For example, a GPU command may be an OPENCL statement directing the GPU to calculate a dot-product of a first matrix stored at a first memory location and a second matrix stored at a second memory location. Many other types of commands are possible, and may correspond to graphical tasks such as rendering one or more polygons, etc. Commands may be in any number of formats and/or computer languages in different embodiments. In some embodiments, a GPU may support multiple different types or styles of commands (e.g., OPENCL, OPENGL, OPENAL, or other languages and/or programming frameworks). A GPU command may correspond in some embodiments to a particular computing process (or thread) running on a CPU to which the GPU is connected.

As further described below, in some embodiments, a GPU command may have one or more corresponding lower-level "tasks" associated with it. A "task" may be further broken down (split) into one or more threads and/or one or more instructions in various embodiments. See paragraphs 44-47, for example. Thus in one embodiment, a GPU command will have one or more corresponding tasks, where each task has one or more corresponding threads, and where each thread includes one or more instructions.

In the embodiment of FIG. 2, interface logic 62 may receive commands for execution by the GPU. Such commands may be received from a CPU, and may include pointers to memory (i.e., pointers to data and/or further instructions for execution). Interface logic 62 may deliver results to the CPU, or otherwise indicate to the CPU that results of calculations are ready (e.g., logic 62 may notify the CPU that results are stored at a location in memory and ready to be retrieved). Thus, in various embodiments, interface logic 62 may be configured to communicate directly with a CPU, a memory controller, and/or other structures depicted in FIG. 1 (or as may otherwise be present in a computing device or computer system). As shown in FIG. 2, interface logic 62 is coupled to one outgoing communication connection, but other configurations are possible (e.g., logic 62 may have a connection to a CPU and another connection to memory or a memory controller, etc.).

Interface logic 62 is also configured, in some embodiments, to receive information indicating a VGPU to which a particular (incoming) command corresponds. That is, logic 62 may receive information indicating the VGPU to which a command belongs (or is assigned to). In one embodiment, this information is indicated in a bit field specifying a numeric value 0 to (N−1), where N is the number of VGPUs. The VGPU indicator may be part of the GPU command itself in one embodiment, while in another embodiment, the VGPU indicator may be stored separately (e.g., in a memory location pointed to by a pointer in the GPU command).

Interface logic 62 and/or VGPUs 52 may be configured to route a GPU command to a particular instruction buffer 54 based on the VPGU indicator in various embodiments. Thus, in an embodiment with 8 VGPUs, a bit field of 011 for a particular command will result in that command being routed to an instruction buffer for VGPU #3, while a bit field of 000 for a different command will result in the different command being routed to an instruction buffer for VGPU #0. (Note that in some embodiments, instruction buffer(s) 54 may be shared between two or more VGPUs; in other words, the same instruction buffer may hold commands for different VGPUs Likewise, in some embodiments, storage location(s) 56 may be shared between two or more VGPUs. In these embodiments with shared structures, the indication of the VGPU may be maintained in an accessible manner along with corresponding data, commands, or instructions.) In accordance with the above, one or more instruction buffers 54 in each VGPU 52 may thus be configured to store one or more commands to be executed. Interface logic 62 is configured, in various embodiments, to appropriately route commands received from a CPU to the appropriate VGPU and to the appropriate one of instruction buffer(s) 54.

GPU commands may be processed by task manager 55 in the embodiment of FIG. 2. In this embodiment, task manager 55 is configured to create one or more tasks corresponding to a command stored in one of instruction buffer(s) 54 in order to complete execution of that command by the GPU. Thus, a task may represent one or more computer operations that are specified at a lower level than a GPU command.

For example, in one embodiment, a GPU command might specify that a red-colored cube should be drawn according to a specified color and set of eight vertices defining the cube edges. For each face of the cube, a different task might be created to calculate boundaries for that face, while one or more other tasks might be created to shade and/or color the visible portions of the cube. One GPU command may accordingly be expanded into any number of tasks by task manager 55.

In one embodiment, task manager expands (or splits) a GPU command into one or more tasks by reading stored instructions (that is, in one embodiment, tasks for a given GPU command are pre-specified.) Task manager 55 may include particular logic (hardware, firmware, software, or some mixture thereof) to handle different types of commands. For example, task manager 55 may be configured to create certain tasks in response to an OPENCL instruction that specifies a matrix multiplication, while creating other particular tasks in response to an OPENGL instruction that specifies shading to be performed for multiple polygons. The number of tasks created and/or managed by task manager 55 for a given command may vary according to the type of command, its parameters, and/or specific memory contents accompanying the command (e.g., tasks may depend on specific data for a particular command).

In some embodiments, task manager 55 is configured to split a given task into one or more GPU execution "threads" for processing by one or more of execution unit(s) 60 in the GPU. In some embodiments, a GPU thread is executed at an even lower level than a task. In order to fully render a visible side of a red-colored cube, for example, chromatic and brightness values may have to be calculated for each visible pixel. One thread may be executed in order to calculate a brightness value for a single pixel or for a group of pixels (e.g., a 4×4 pixel array) in various embodiments. Accordingly, a single GPU task may be expanded into any number of threads by task manager 55. Task manager 55 may include particular logic (hardware, firmware, software, or some mixture thereof) to handle thread generation for different types of tasks. In some embodiments, tasks and threads are one and the same (i.e., in these embodiments, the "task" organizational level is the same as the organizational level for "threads," and every task comprises one thread). In one embodiment, task manager is configured to split a task into one or more threads by reading instructions stored at a location in memory (that is, task manager 55 may be configured to generate one or more threads to be executed by retrieving stored instructions). In accordance with the above, in one embodiment, task manager 55 is configured to generate one or more threads and/or instructions corresponding to a task and/or to a GPU command.

Accordingly, one or more instruction buffer(s) 54 may store commands, tasks, threads, or any combination thereof for a corresponding VGPU. Thus, in one embodiment, a particular GPU command is received by interface logic 62 and routed to one or more instruction buffer(s) 54. (In this embodiment, an instruction buffer that is configured to store GPU commands may be referred to as a "command buffer.") Task manager 55 may then cause a command to be translated and/or split into a number of corresponding tasks, each of which may itself be further split into any number of threads and/or lower level instructions to be executed. Accordingly, all GPU commands, tasks, threads, and/or instructions may then be stored in one or more instruction buffer(s) 54, along with information indicating an identity of the VGPU (e.g., a bit field) to which those commands, tasks, threads, and/or instructions correspond. Identifying information for a VGPU may take other forms however, and may be structurally implicit in some embodiments (e.g., the mere fact that certain bit lines or portions of circuitry are carrying signals or being used to store information may denote the identity of a VGPU).

For any command, task, and/or thread, various information may be maintained and/or updated by task manager 55 as execution progresses through the one or more execution units 60. This information maintained by task manager 55 may include a program counter, a VGPU identifier, and address space information indicating one or more address ranges (virtual and/or physical) to which a particular VGPU is allowed access. Other information not explicitly mentioned may also be maintained and/or updated by task manager 55 in various embodiments. (Address space is also discussed further below relative to memory manager 64, but note that in some embodiments, if overlapping address ranges were assigned to different VGPUs, erroneous calculations could result).

In one embodiment, the GPU may support one virtual GPU per CPU thread. In a unified memory system, this may allow the CPU to hand off computing work to the GPU on a fine-grained basis. In such an embodiment, virtual GPUs may be time sequenced in a fair share priority, or may be matched to CPU thread priority. (That is, in one embodiment, a priority level for a thread on the CPU determines a priority level for a command, task, thread, and/or instruction for the GPU. In one particular embodiment, three virtual GPUs are present: one for user interface (UI) instructions, one for "regular" instructions, and one for background instructions. In this embodiment, the UI virtual GPU has priority over the "regular" virtual GPU, which in turn has priority over the "background" virtual GPU.

Selection and Prioritization for VGPUs

When one or more threads are ready to be executed, feeding unit 58 may select those threads and forward them to execution unit(s) 60. In some embodiments, forwarding a thread comprises sending a program counter (identifying a location of one or more executable instructions) to an execution unit. The execution unit can then fetch the instructions and cause them to be executed. In one embodiment, forwarding a thread to an execution unit includes providing a stream of one or more executable instructions themselves (e.g., a series of bits including an operand and/or an opcode). In some embodiments, feeding unit 58 is configured to select and forward threads on an individual basis. In other embodiments, however, feeding unit 58 is configured to select and forward threads on a task-level basis, and in such an embodiment, all threads for a particular task will be forwarded to execution unit(s) 60 (rather than forwarding only a portion of the threads). Accordingly, in these embodiments, selection and forwarding may be said to occur at a granularity of the task level, rather than a granularity of the thread level.

Selection of threads by feeding unit 58 may be performed in accordance with one or more priority schemes. In the embodiment of FIG. 2, a fixed priority scheme is employed. In this embodiment, VGPU 52A has the highest priority, VGPU 52B has the next highest priority, and VGPU 52C has the lowest priority. Accordingly, when feeding unit 58 determines what thread(s) to forward to execution unit(s) 60, a waiting thread (or task) for VGPU 52A will be executed in preference to a waiting thread for either VGPU 52B or VGPU 52C. In this scheme, threads (or tasks) for VGPU 52A will continue to execute (i.e., be forwarded for execution by the feeding unit) until none remain, at which time threads or tasks for VGPU 52B or VGPU 52C will be forwarded to execution unit(s) 60 (with preference being given to VGPU 52B).

Other prioritization schemes are possible and are contemplated. For example, in one scheme, a number of VGPUs in GPU 50 may be used by a number of threads for a CPU to which the GPU is configured to connect. Each CPU thread may have its own priority level (which may be set by an operating system, for example). In this scheme, when a CPU thread dispatches a GPU command to one of the VGPUs, that command (and its related tasks, threads, and/or instructions) may be given the same priority level as that of the corresponding CPU thread.

In another priority scheme (which may be used in some of the same embodiments as the last discussed scheme), a VGPU may be assigned any one of a discrete number of different priorities. As an example, four VGPUs might each have a variable priority level from 0-3, with priority level 0 taking highest precedence. In one variant, two or more VGPUs having the same level of priority may have threads or tasks forwarded by feeder unit 58 in accordance with one or more fairness schemes (for example, weighted or non-weighted round robin arbitration could be used). In some embodiments, priority schemes may involve service level guarantees (e.g., a particular priority level may guarantee execution of a GPU command, task, and/or thread within some particular time frame or within some number of clock cycles). Weighted round robin arbitration can also be used for VGPU priority selection in one such embodiment (which can avoid lengthy stalls for lower level priority commands, tasks, or threads). Accordingly, determining the particular VGPU that gets to make use of an available execution unit 60 may be subject to various factors.

In accordance with the above, the feeding unit is configured in the embodiment of FIG. 2 to forward threads corresponding to a given GPU command to one or more execution units based on a priority level for the given GPU command. (This priority level may in turn be based on an identity of the VGPU; that is, some VGPUs may have higher, lower, or the same priority as others). One or more threads corresponding to a given GPU command may thus be selectively forwarded in preference to other threads corresponding to a lower priority GPU command. (The one or more threads for the lower priority GPU command may be forwarded at a later time, however, after threads corresponding to a GPU command with higher priority are forwarded, in one embodiment).

The feeding unit is also configured, in one embodiment, to forward threads and/or instructions for execution based on the types of execution units that are available and ready for use. For example, a lower priority thread may be forwarded to a particular type of execution unit (e.g., shading) if there are no waiting higher priority threads that can be executed on that type of execution unit. Thus, in the embodiment of FIG. 2, if a shading unit 60 is free but higher priority VGPUs 52A and 52B have no shading threads ready for execution, a thread from lowest priority VGPU 52C might instead be selected. Accordingly, thread selection and forwarding is based on the type of thread and/or the types of instructions comprising that thread, in some embodiments.

Execution

Execution unit(s) 60 are configured to execute instructions for each of the VGPUs. The execution unit(s) may be configured according to techniques known to those with ordinary skill in the art, and are also configured in various embodiments to execute instructions that correspond to threads, tasks, and/or commands for particular VGPUs. In some embodiments, one or more of execution unit(s) 60 are pipelined, and thus may execute instructions for different VGPUs concurrently. One or more execution unit(s) 60 are also multi-threaded in some embodiments. Accordingly, an individual execution unit in such embodiments may support concurrent execution of instructions for two or more threads (in some cases, hundreds or thousands of threads). Execution unit(s) 60 may comprise, but are not limited to, any combination of one or more of the following: shading units, texturing units, tiling units, vertex units, vector math units, etc.

Execution unit(s) 60 are configured to generate results for executed threads and/or instructions in the embodiment of FIG. 2. In some embodiments, other structures may also generate all or a portion of results for executed threads and/or instructions. Execution unit(s) 60 are configured to maintain an indicator, in one embodiment, of which VGPU a given instruction belongs to as that instruction is being executed (e.g., passes through the execution pipeline). After results of a given instruction are calculated in the embodiment of FIG. 2, GPU 50 is configured store the results in an appropriate one of storage location(s) 56 based on the indicator of the VGPU to which that instruction belongs. Accordingly, when results of an instruction (or a series of one or more instructions) for VGPU 52A are calculated, they can be sent to a storage location 56 that corresponds to that particular VGPU (and likewise with VGPUs 52B and 52C). In various embodiments, results of instructions may include data and/or memory pointers (i.e., pointers to an address in memory where other data resides). In one embodiment, one or more sets of registers are configured to store data values for instructions corresponding to different VGPUs. Thus, in one embodiment, a GPU having an architected design that includes 64 different registers may have a total of 256 registers (4*64) to implement a register set for each one of four VGPUs that is supported by the GPU.

The results of execution of threads and/or instructions, in some embodiments, include additional information. In one embodiment, the results of execution may include an indication that all instructions for a particular thread have been executed (i.e., the thread has finished executing). Results of execution may also include an indication that execution is complete for a particular task or for a particular GPU command. In one embodiment, results of instructions may also include one or more program counter values (which may be incremented to a next instruction or thread to be executed, for example). Thus, each VGPU may have one or more corresponding program counters in some embodiments.

Suspending and resuming execution for VGPUs may occur at different levels of granularity in different embodiments. That is, a GPU command, task, thread, or instruction may be frozen while a higher priority VGPU uses execution unit(s) 60. The stored results of execution (e.g., in storage locations 56) can then be used in order to resume execution for a particular VGPU when it regains priority in the GPU.

Execution of a thread can be resumed at a next instruction, in one embodiment, by using a last program counter value for the thread (VGPU granularity on an instruction level). Execution of a task can be resumed, in one embodiment, by starting execution of a new thread necessary for completion of the task (VGPU granularity on a thread level). Such a resumption in execution might occur, for example, after execution was previously halted at the end of a previous thread, but before a next thread was started.

Execution of a GPU command can be resumed by starting execution of a next task (VGPU granularity on a task level). Granularity (and priority selection) at the command level is also possible in some embodiments. These levels of granularity are not exclusive of one another, however—for example, execution of a GPU command could be resumed by starting in the middle of a partially executed thread, or in the middle of a partially executed task in some embodiments. Resuming execution includes retrieving intermediate results from a set of one or more registers dedicated to a particular VGPU, in some embodiments.

Note that generally, the term "priority level" may be applied to any or all of a VGPU, a GPU command, a task, a thread, and/or an instruction. For example, a thread may be said to have a certain priority level, or a certain priority level may be said to correspond to (or be "for") an instruction or a task. Accordingly, in some embodiments, each instruction in a thread may be said to have the same priority level as the thread; each thread belonging to a task may be said to have the same priority level as the task; and each task corresponding to a GPU command may be said to have the same priority level as the GPU command itself. In one embodiment, all GPU commands, tasks, threads, and/or instructions that correspond to a particular VGPU are all executed at the priority level of that VGPU.

GPU Memory Management and Resource Allocation

Each VGPU 52 has a protected data and address space in the embodiment of FIG. 2. Although execution unit(s) 60 are used to execute different threads and/or instructions for different VGPUs in this embodiment, the GPU may operate in a manner so that results of execution for one VGPU are not overwritten by results of execution for a different VGPU. For this reason, in the embodiment of FIG. 2, storage location(s) 56 include a set of registers used for computation and/or for storing results. In addition to affecting register values, however, execution of instructions may also alter data stored in memory (either local GPU memory and/or system memory accessible via interface logic 62).

Accordingly, in the embodiment of FIG. 2, memory manager 64 is configured to manage memory access for multiple VGPUs. In particular, memory manager 64 is configured to handle issues arising from the use of virtual address spaces. As shown in FIG. 2, a different virtual address space is used by each VGPU. Each VGPU may be able to access memory in a (virtual) range that is 512 MB in size, for example. By using virtual address ranges rather than physical memory address ranges, generating threads and/or instructions from tasks and/or GPU commands may be simplified (in some embodiments) because the virtual memory address ranges are numerically identical (and there is thus no need to perform specific memory address calculations that might be different based upon different physical base addresses). A first instruction for a first VGPU and a second instruction for a second VGPU thus may both target the exact some location(s) in virtual address space (but will not interfere with one another). In such an embodiment, memory manager 64 is configured to ensure that when data is read from or written to memory in each of the VGPUs, different non-overlapping portions of actual physical memory are used.

In some embodiments, a given VGPU may thus be allocated different portions of physical memory at any given time. In some embodiments, this allocation may be quite simple. For example, if a GPU has an equal or greater amount of physical memory to the number of VGPUs multiplied by the length of the VGPU virtual address space, then there may be no conflict, and each VGPU can simply be assigned exclusive use of one or more physical memory portions. For example, in a GPU with 4 GB memory and 8 VGPUs each having a virtual address space of 512 MB, there may be no conflicts. However, in some embodiments, the total amount of virtual memory space for the VGPUs may exceed the amount of available physical memory in the GPU. For example, if three VGPUs each have a 2 GB virtual address space, but the GPU only has 3 GB of memory, there may not be enough physical memory to accommodate all VGPUs. In such embodiments, memory manager 64 is configured to allocate (and map) physical memory to the virtual address spaces of the various VGPUs.

Physical memory allocation to virtual address space may be performed in a variety of manners. In one embodiment, a highest priority VGPU may be physically allocated its entire virtual address range, while lower priority VGPUs are allocated some portion of their respective virtual address ranges. In another embodiment, a higher priority VGPU is allocated some greater portion of its virtual address range, while lower priority VGPUs are allocated some lesser portions of their respective virtual address ranges. Further, in some embodiments, physical memory allocation may be performed on as "as needed" basis. In such embodiments, a VGPU for which a thread and/or instruction has been most recently executed may be given priority on any memory requests. Thus, if an active VGPU requires more physical memory when none is available, physical memory for one of the other VGPUs may be de-allocated so that the active VGPU may use it for calculations, storing results or instructions to be executed, etc. De-allocation of physical memory may include, in some embodiments, copying information from the GPU to an external location (e.g., main system memory or other storage device) via interface logic 62. "As needed" physical memory allocation is also useful in that physical memory may not be allocated until a VGPU actually requires it (for example, if the threads and/or instructions being executed by a VGPU only require 24 MB of memory out of a virtual address space of 1 GB, it would potentially be wasteful to allocate that entire 1 GB out of physical memory).

Accordingly, memory manager 64 is configured to map between virtual memory and physical memory, and may serve as a transparent interface between execution unit(s) 60 and memory of the GPU and/or other system memory. Thus, in one embodiment, all memory accesses by execution unit(s) 60 include a step in which memory manager 64 performs a conversion from a virtual address to a physical address. Memory manager 64 is configured, in one embodiment, to perform virtual address translation for a given instruction based on information associated with that instruction that identifies a particular one of VGPUs 52. For example, memory manager 64 may maintain one or more look-up tables that are indexed by VGPU ID. In some embodiments, physical memory is allocated on a page-by-page basis. For example, if a thread and/or instruction is attempting to write to a virtual address that has not yet been allocated (i.e., has never before been written to), the memory manager will allocate one or more (physical) memory pages to the corresponding VGPU. Other GPU resources may be managed and/or configured by memory manager 64 in various embodiments, including the number or proportion of (shared) "temporary registers" that a VGPU may be allocated. (In another embodiment, this function may be performed by execution unit(s) 60.)

Figure 3:
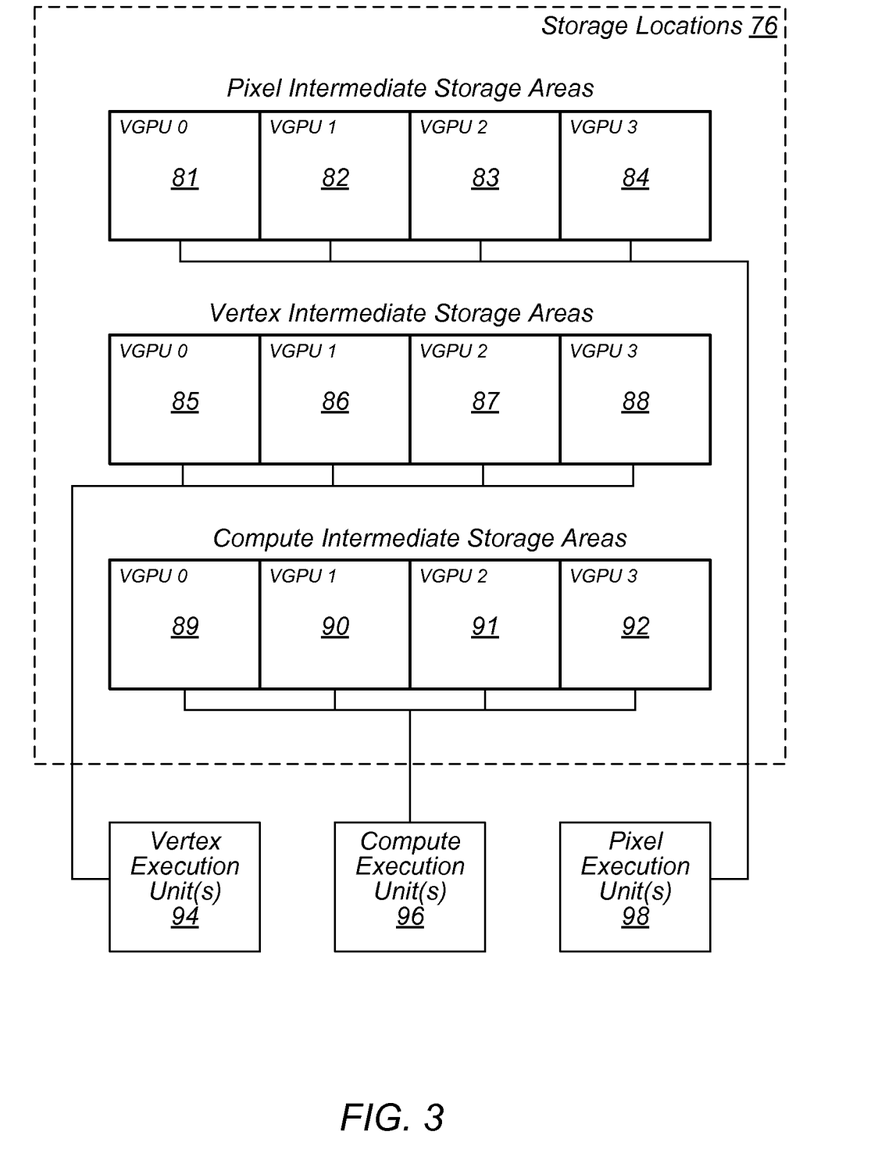
FIG. 3 is another block diagram of a GPU embodiment in which multiple virtual GPUs are implemented.

Turning now to FIG. 3, a block diagram of one embodiment of a GPU is depicted. In FIG. 3, a GPU includes storage locations 76 and execution units 94, 96, and 98. In various embodiments, storage locations 76 may have any or all of the properties and/or functionality of storage location(s) 56, for example, as described with respect to FIG. 2.

Vertex execution unit(s) 94 includes one or more execution units that are configured to perform vertex processing operations. Pixel execution unit(s) 98 includes one or more execution units that are configured to perform pixel processing operations. Compute execution unit(s) 96 includes one or more execution units that are configured to perform other computing operations (e.g., general arithmetic and/or array operations). In various embodiments, execution units 94, 96, and 98 may have any or all of the properties and/or functionality of execution unit(s) 60 (e.g., as described with respect to FIG. 2). In some embodiments, additional execution units or execution unit types may be present in a GPU. As shown, storage areas 81-92 are connected to execution units 94, 96, and 98 via one or more busses, point-to-point transmission lines, and/or interconnects.

Each of execution units 94, 96, and 98 has corresponding storage for intermediate results. Accordingly, in FIG. 3, storage areas 81-84 are configured to store intermediate results for pixel processing operations, storage areas 85-88 are configured to store intermediate results for vertex processing operations, and storage areas 89-92 are configured to store intermediate results for other compute operations. As shown, particular storage areas correspond to particular virtual GPUs (e.g., storage 81 corresponds to VGPU #0, while storage 82 corresponds to VGPU #1).

In some embodiments, a combined execution unit may implement all or a portion of the functionality of vertex execution unit 94, all or a portion of the functionality of compute unit 96, and all or a portion of the functionality of pixel execution unit 98. For example, in one embodiment, a common shading execution unit may implement all or a portion of vertex, pixel, and compute processing. In such an embodiment, there may be particular logic dedicated to assisting vertex operations, particular logic dedicated to assisting pixel operations, and/or particular logic dedicated to assisting compute operations, but other portions of the common execution unit (e.g., an execution pipeline) may be shared and commonly used in performing different types of processing operations.

Thus, in various embodiments, a virtual GPU may have storage provided for all non-transient (intermediate) states, including distributed storage corresponding to task queues, pre-vertex shading primitive state, post-vertex shading primitive state, pre-fragment shading primitive state, and depth, stencil, and color framebuffer state. Thus in one embodiment, storage for the above state information can be distributed throughout the GPU close to where the state is used, with a unique copy per virtual GPU, while storage for active vertex and fragment shading processing is tied to the shading processing units which are common for the virtual GPUs. Intermediate stored information corresponding to a virtual GPU may be stored at various locations along the entire graphics execution pipeline in a GPU. Thus, while FIG. 3 depicts storage 81 as intermediate pixel processing storage for VGPU #0, storage space 81 may actually be a number of different storage areas located in two or more physically separate memories, caches, registers, etc., that are located in different areas of a GPU. Similarly, any one of storage areas 81-92 may be distributed across two or more locations within a GPU in various embodiments.

In the embodiment of FIG. 3, virtual GPU #0 has a first storage area 81 that is configured to store intermediate vertex-processing results that are usable to resume execution of one or more incomplete vertex-processing operations. Virtual GPU #0 also has a second storage area 85 that is configured to store intermediate pixel-processing results usable to resume execution of one or more incomplete pixel-processing operations. A third storage area 89 may be configured to store other intermediate computing results usable to resume execution of the other computing operations. Each of virtual GPUs #1, #2, and #3 may have similar corresponding intermediate storage. Note that while the embodiment of FIG. 3 shows four virtual GPUs, other embodiments may use a lesser or greater number of GPUs, as discussed elsewhere in this disclosure.

In various embodiments, incomplete vertex-processing operations, incomplete pixel-processing operations, and/or incomplete compute operations may be resumed at varying levels of granularity. In one embodiment, some or all of these types of operations may be resumed on a per-thread basis. Thus, in such an embodiment, a thread may be fully executed while transitory information from the thread is not stored by storage areas such as 81-92. Instead, in such an embodiment, results may be stored upon completion of a thread. Thus, execution might be halted and resumed at the thread level, but would not necessarily be halted and resumed between two or more instructions that comprise an individual thread. In other embodiments, some or all of incomplete vertex-processing operations, incomplete pixel-processing operations, and incomplete compute operations may be resumed on a task level of granularity. In such embodiments, intermediate information for the resumption of execution may be stored after a task is completed, but resumption information may not necessarily be stored that would allow halting and resumption of execution between two or more threads that comprise a task that is being executed. Other levels of granularity for the storage of intermediate results that allow the resumption of execution are possible and contemplated (e.g., instruction level granularity or GPU command level granularity). See, e.g., paragraphs 0046 to 0048 above.

In one further embodiment, one or more of storage areas 81-92 are distributed across respective pluralities of different locations in the GPU. Thus, a storage area such as 81 may include one or more memory buffers, registers, or other structures configured to store information (e.g., shading storage information, etc.). These storage structures may, in some embodiments, be located at different portions of the GPU due to their proximity to particular execution areas in the GPU pipeline. A storage area such as 81 may include storage implemented as queues, random-access memory, or other information access schemes. Accordingly, storage areas such as 81-92 may, in various embodiments, include one or more storage structures corresponding to task queues, command buffers, or other GPU front-end operations; pre-vertex shading primitive state; post-vertex shading primitive state; pre-transform vertex state; post-transform vertex state; pre-fragment shading primitive state; rasterization and/or interpolation; depth, stencil, and color framebuffer state; or other GPU structures known to those with skill in the art that may retain state-based information.

Therefore, in various embodiments, the use of storage areas 81-92 may allow a GPU to rapidly switch between execution of pixel and vertex processing operations for different virtual GPUs at a finer granularity than previous solutions, allowing tasks, threads, instructions, etc., to be executed for different virtual GPUs during smaller windows of time (for example). Further, the embodiment of FIG. 3 is compatible with (or may be modified in view of) other embodiments and features described elsewhere in this disclosure, as would occur to a person having skill in the art of graphical processor design.

Figure 4:
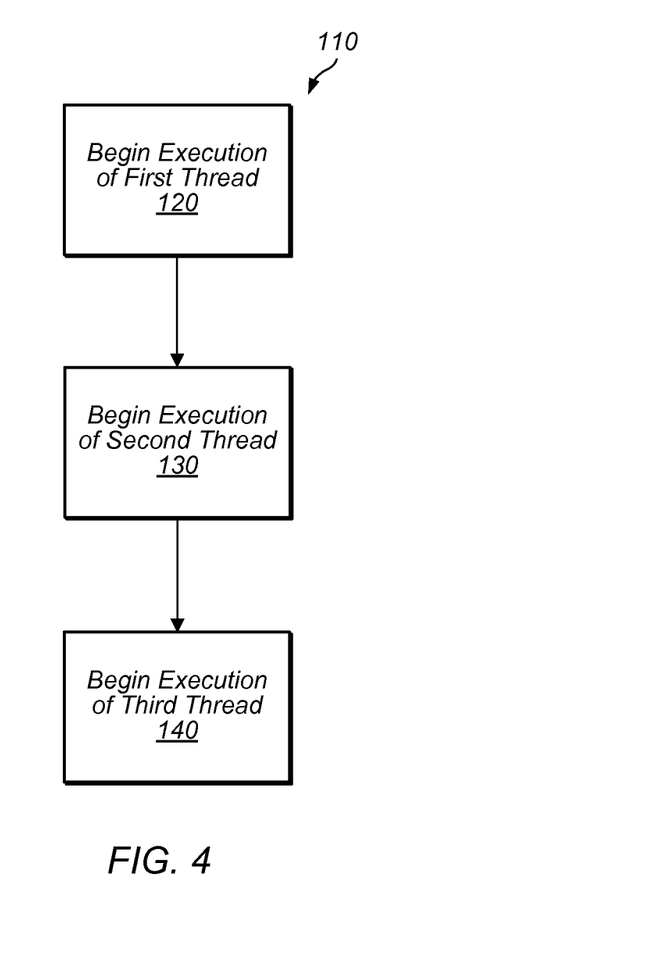
FIG. 4 is a flow chart of one embodiment of a method in which multiple GPU threads may be executed.

Turning now to FIG. 4, a flow chart of one embodiment of a method 110 in accordance with the present disclosure is shown. In various embodiments of method 110 described below, one or more of the elements and/or steps described may be performed concurrently, in a different order than shown, or may be omitted entirely. Other additional elements may also be performed as desired. Further, only some portions of some method steps are performed in some embodiments. All or a portion of steps of method 110 may be performed by GPU 50 in some embodiments, and should be understood in view of the disclosure discussed above relative to FIG. 2.

In step 120, execution of a first thread is begun by a graphics processing unit (GPU), where the first thread corresponds to a first GPU command. Execution of the first thread is begun, in this embodiment, before beginning execution of a second thread corresponding to a second GPU command. Beginning execution of the first thread is based on a first priority level for the first GPU command being higher than second a priority level for a second GPU command, where the priority levels for the first and second GPU commands are based on identities of virtual GPUs to which the first and second GPU commands correspond. The terms "beginning execution" or "executing" and their variants may refer, in this disclosure, to forwarding one or more threads and/or instructions to one or more execution units of a GPU. In some embodiments, "beginning execution" or "executing" may refer to resuming a GPU command, task, and/or thread that has had some portions previously calculated, but for which execution has not fully completed.

In step 130, execution of the second thread is begun based on an indication that there are no other GPU commands having priority levels higher than the second priority level. This indication, in one embodiment, comprises command buffers for all other virtual GPUs (except for the one corresponding to the second thread) being empty. In another embodiment, the indication comprises information indicating that not all threads for a given virtual GPU have been forwarded to an execution unit. In step 140, execution of a third thread corresponding to a third GPU command is begun before beginning execution of all threads corresponding to the first GPU command, wherein beginning execution of the third thread is based on a third priority level that is higher than the first priority level, wherein the third priority level is based on an identity of a virtual GPU to which the third GPU command corresponds. Accordingly, the third thread may have a higher priority level than the first thread, which may itself have a higher priority level than the second thread each of the first, second, and third threads may respectively correspond to different ones of a plurality of virtual GPUs.

Exemplary Computer System

Figure 5:
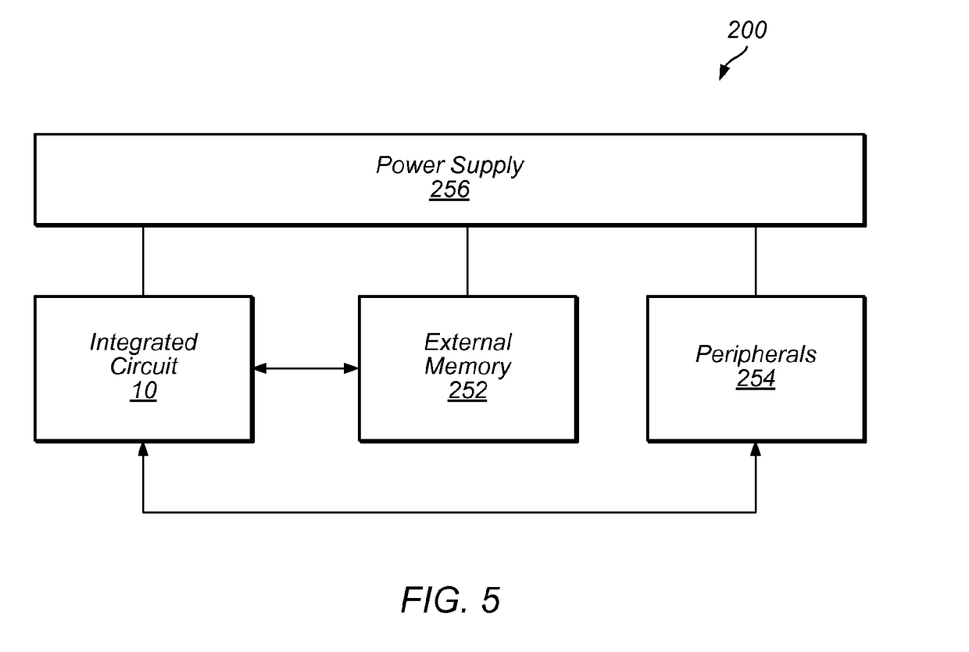
FIG. 5 is a block diagram of one embodiment of a system.

Turning next to FIG. 5 a block diagram is shown of one embodiment of a system 200 in which GPU 50 may appear. In the illustrated embodiment, the system 200 includes at least one instance of an integrated circuit 10 coupled to an external memory 252. The external memory 252 may form the main memory subsystem discussed above with regard to FIG. 1 (e.g. the external memory 252 may include the memory 12A-12B). The integrated circuit 10 is coupled to one or more peripherals 254 and the external memory 252. A power supply 256 is also provided which supplies the supply voltages to the integrated circuit 10 as well as one or more supply voltages to the memory 252 and/or the peripherals 254. In some embodiments, more than one instance of the integrated circuit 10 may be included (and more than one external memory 252 may be included as well).

The memory 252 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 10 in a chip-on-chip configuration, a package-on-package configuration, or a multi-chip module configuration.

The peripherals 254 may include any desired circuitry, depending on the type of system 200. For example, in one embodiment, the system 200 may be a mobile device (e.g. personal digital assistant (PDA), smart phone, etc.) and the peripherals 254 may include devices for various types of wireless communication, such as WIFI, BLUETOOTH, cellular, global positioning system, etc. The peripherals 254 may also include additional storage, including RAM storage, solid state storage, or disk storage. The peripherals 254 may include user interface devices such as a display screen, including touch display screens or multitouch display screens, keyboard or other input devices, microphones, speakers, etc. In other embodiments, the system 200 may be any type of computing system (e.g. desktop personal computer, laptop, workstation, net top etc.).

Computer Readable Medium and Hardware Fabrication

The above-described techniques and methods may be implemented as computer-readable instructions stored on any suitable computer-readable storage medium. As used herein, the term computer-readable storage medium refers to a (nontransitory, tangible) medium that is readable by a computer or computer system, and includes magnetic, optical, and solid-state storage media such as hard drives, optical disks, DVDs, volatile or nonvolatile RAM devices, holographic storage, programmable memory, etc. The term "non-transitory" as applied to computer readable media herein is only intended to exclude from claim scope any subject matter that is deemed to be ineligible under 35 U.S.C. §101, such as transitory (intangible) media (e.g., carrier waves), and is not intended toexclude any subject matter otherwise considered to be statutory.

Such a computer-readable storage medium as described above can be used in some embodiments to store instructions read by a program and used, directly or indirectly, to fabricate the hardware comprising GPU 50, IC 10, and/or portions thereof. For example, the instructions may outline one or more data structures describing a behavioral-level or register-transfer level (RTL) description of the hardware functionality in a high level design language (HDL) such as VERILOG or VHDL. The description may be read by a synthesis tool, which may synthesize the description to produce a netlist. The netlist may comprise a set of gates (e.g., defined in a synthesis library), which represent the functionality of GPU 50, IC 10, and/or portions thereof. The netlist may then be placed and routed to produce a data set describing geometric shapes to be applied to masks. The masks may then be used in various semiconductor fabrication steps to produce a semiconductor circuit or circuits corresponding to hardware embodiments. Alternatively, the database may be the netlist (with or without the synthesis library) or the data set, as desired. One embodiment is thus a (non-transitory) computer readable storage medium comprising a data structure which is usable by a program executable on a computer system to perform a portion of a process to fabricate an integrated circuit including circuitry described by the data structure, wherein the circuitry described in the data structure includes GPU 50, IC 10, and/or portions thereof.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Additionally, section or heading titles provided above in the detailed description should not be construed as limiting the disclosure in any way.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a graphics processing unit (GPU) comprising a plurality of storage locations and a plurality of execution units and configured to implement a plurality of virtual GPUs having corresponding variable priority levels, wherein:
the GPU is further configured to modify the corresponding variable priority levels of at least one of the plurality of virtual GPUs based on an arbitration scheme;
the GPU is further configured to receive a plurality of GPU commands and a corresponding plurality of virtual GPU indicators that indicate, for the plurality of GPU commands, corresponding ones of the plurality of virtual GPUs;

the plurality of execution units are configured to execute the GPU commands for the plurality of virtual GPUs;

a priority level for a given GPU command is based on a priority level of a corresponding one of the plurality of virtual GPUs; and the GPU is further configured to store, in at least one of the plurality of storage locations, intermediate results that are usable to resume execution of one or more incomplete operations corresponding to one or more of the plurality of virtual GPUs.

2. The apparatus of claim 1, wherein first and second storage areas of the plurality of storage locations are configured to store intermediate results corresponding to respective virtual GPUs of the plurality of virtual GPUs, and wherein the first and second storage areas for each of the plurality of virtual GPUs are each distributed across a respective plurality of different locations in the GPU.

3. The apparatus of claim 1, wherein the GPU further comprises:

a command buffer configured to store a plurality of the GPU commands; and one or more execution units;

wherein the apparatus is configured to forward, based on a priority level for a given GPU command, one or more instructions corresponding to the given GPU command to the one or more execution units.

4. The apparatus of claim 3, wherein each of the plurality of virtual GPUs has its own priority level.

5. The apparatus of claim 3, further comprising one or more instruction buffers configured to store instructions corresponding to one or more of the plurality of the GPU commands and configured to store information indicating an identity of a virtual GPU to which each of the instructions corresponds.

6. The apparatus of claim 1, wherein the GPU is configured to resume the one or more incomplete operations on a per-thread basis.

7. The apparatus of claim 1, wherein the GPU is configured to allocate, to a first one of the plurality of virtual GPUs, an amount of physical memory corresponding to an entire virtual address space of the first virtual GPU, and to allocate, to a second one of the plurality of virtual GPUs, an amount of the physical memory corresponding to only part of a virtual address space of the second virtual GPU.

8. The apparatus of claim 1, wherein a particular GPU command of the plurality of GPU commands includes a corresponding virtual GPU indicator of the plurality of virtual GPU indicators.

9. A system, comprising:

a graphics processing unit (GPU) configured to receive GPU commands from a central processing unit (CPU) and configured to implement a first virtual GPU and a second virtual GPU having corresponding variable priority levels, wherein:

the GPU is further configured to implement a first virtual GPU and a second virtual GPU having corresponding variable priority levels;

the GPU is further configured to modify the variable priority levels based on an arbitration scheme;

the GPU is further configured to receive a first virtual GPU indicator that identifies, for a first GPU command, a first virtual GPU;

the GPU is further configured to receive a second virtual GPU indicator that identifies, for a second GPU command, a second virtual GPU;

the GPU is further configured, based on a priority level for the first GPU command being higher than a priority level for the second GPU command, to execute a first thread corresponding to the first GPU command before a second thread to the second GPU command; and the priority level for the first GPU command is based on a priority level of the first virtual GPU and the priority level for the second GPU command is based on a priority level of the second virtual GPU.

10. The system of claim 9, wherein the GPU is configured to receive, from the CPU, information indicating:

the priority level for the first GPU command and the priority level for the second GPU command.

11. The system of claim 10, wherein instructions corresponding to the first virtual GPU are given execution preference over instructions corresponding to the second virtual GPU; and wherein instructions corresponding to the second virtual GPU are given execution preference over instructions corresponding to a third virtual GPU.

12. The system of claim 9, wherein the GPU comprises one or more execution units that are configured to execute a first type of thread;

wherein the GPU is configured to execute a low-priority thread of the first type at the one or more execution units based on an indication that no other threads of the first type are ready to be executed and have a higher priority level than the low-priority thread.

13. The system of claim 9, wherein the GPU is configured to split a given GPU command into one or more tasks, wherein each of the one or more tasks comprises one or more threads;

wherein the GPU is configured to assess a priority level of the given GPU command prior to executing a thread for a given one of the one or more tasks.

14. The system of claim 9, wherein the GPU is configured to allocate amounts of physical memory to each of a plurality of virtual GPUs based on a respective priority level for each of the virtual GPUs.

15. The system of claim 9, further comprising the CPU;

wherein the CPU supports a plurality of CPU threads; and wherein priority levels for GPU commands are based on CPU priority levels for each of the plurality of CPU threads.

16. A graphics processing unit (GPU), comprising:

one or more circuits configured to implement a plurality of virtual GPUs having corresponding variable priority levels based on an arbitration scheme, wherein each of the one or more circuits includes:

one or more corresponding instruction buffers configured to store one or more GPU commands; and one or more corresponding storage locations configured to store execution results;

a task manager circuit configured to generate one or more threads corresponding to a first GPU command, wherein the first GPU command corresponds to a virtual GPU indicator that indicates a corresponding virtual GPU of the plurality of virtual GPUs;

a memory manager circuit;

one or more execution units; and a feeding unit circuit configured to forward a given thread to at least one of the one or more execution units in response to a priority level for the given thread, wherein the priority level for the given thread is based on a priority level of the corresponding virtual GPU of the plurality of virtual GPUs.

17. The graphics processing unit of claim 16, wherein the one or more execution units comprise a first execution unit of a first type and a second execution unit of a second type;
wherein the feeding unit circuit is configured to forward the given thread based on information indicating a type of execution unit used to execute the given thread.

18. The graphics processing unit of claim 16, wherein the feeding unit circuit is configured to forward a thread having a lower priority level to a first one of the one or more execution units based on an indication there are no higher priority threads waiting to be executed by the first execution unit.

19. The graphics processing unit of claim 16, wherein for each of the plurality of virtual GPUs, the corresponding one or more storage locations include one or more registers and a program counter value.

20. A method, comprising:
running a plurality of virtual graphics processing units (GPUs) on a GPU, wherein each of the plurality of virtual GPUs has a corresponding variable priority level, and wherein the GPU is configured to modify the variable priority levels based on an arbitration scheme;
receiving, by the GPU, a first GPU command and a first virtual GPU indicator that identifies, for the first GPU command, a first virtual GPU;
receiving, by the GPU, a second GPU command and a second virtual GPU indicator that identifies, for the second GPU command, a second virtual GPU;
executing, by the GPU, a first thread corresponding to the first GPU command, wherein the first GPU command has a first priority level based on the first virtual GPU having the first priority level; and
subsequent to executing the first thread, executing, by the GPU, a second thread corresponding to the second GPU command, wherein the second GPU command has a second priority level based on the second virtual GPU having the second priority level, and wherein the first priority level is higher than the second priority level.

21. The method of claim 20, further comprising the GPU executing the second thread based on an indication that there are no other GPU commands waiting to be executed that have a priority level higher than the second priority level.

22. The method of claim 20, further comprising executing a third thread corresponding to a third GPU command before completing execution of all threads corresponding to the first GPU command, wherein the third GPU command has a third priority level based on a corresponding third virtual GPU having the third priority level, and wherein the third priority level is higher than the first priority level.

23. The method of claim 20, further comprising the GPU receiving, from a central processing unit (CPU), information specifying the first and second priority levels.

24. A non-transitory computer readable storage medium comprising a data structure which is usable by a program executable on a computer system to perform a portion of a process to fabricate an integrated circuit including circuitry described by the data structure, the circuitry described in the data structure including:
a graphics processing unit (GPU) comprising a plurality of storage locations and a plurality of execution units, wherein:
the GPU is configured to implement a plurality of virtual GPUs having corresponding variable priority levels;
the GPU is configured to modify the corresponding variable priority levels of at least one of the plurality of virtual GPUs based on an arbitration scheme;
the GPU is configured to receive a plurality of GPU commands and a corresponding plurality of virtual GPU indicators that indicate, for the plurality of GPU commands, corresponding ones/6 of the plurality of virtual GPUs;
the plurality of execution units are configured to execute the GPU commands for the plurality of virtual GPUs;
a priority level for a given GPU command is based on a priority level of a corresponding one of the plurality of virtual GPUs; and
the GPU is configured to store, in at least one of the plurality of storage locations, intermediate results that are usable to resume execution of one or more incomplete operations corresponding to one or more of the plurality of virtual GPUs.

25. The non-transitory computer readable storage medium of claim 24, wherein the circuitry described in the data structure further includes:
a command buffer configured to store a plurality of the GPU commands; and
one or more execution units;
wherein the GPU is configured to forward, based on a priority level for a given GPU command, one or more instructions corresponding to the given GPU command to the one or more execution units.

* * * * *